United States Patent
Harrop et al.

(10) Patent No.: US 8,516,464 B2
(45) Date of Patent: Aug. 20, 2013

(54) COMPUTER SYSTEM AND METHOD FOR RESOLVING DEPENDENCIES IN A COMPUTER SYSTEM

(75) Inventors: Rob Harrop, Southampton (GB); Glyn Normington, Winchester (GB); Adrian Mark Colyer, Southampton (GB)

(73) Assignee: Gopivotal, Inc., San Mateo, CA (US)

( * ) Notice: Subject to any disclaimer, the term of this patent is extended or adjusted under 35 U.S.C. 154(b) by 965 days.

(21) Appl. No.: 12/608,062

(22) Filed: Oct. 29, 2009

(65) Prior Publication Data

US 2010/0138818 A1     Jun. 3, 2010

Related U.S. Application Data

(60) Provisional application No. 61/164,053, filed on Mar. 27, 2009.

(51) Int. Cl.
*G06F 9/45*          (2006.01)

(52) U.S. Cl.
USPC .......................................... 717/153; 718/106

(58) Field of Classification Search
None
See application file for complete search history.

(56) References Cited

U.S. PATENT DOCUMENTS

| | | | |
|---|---|---|---|
| 5,721,824 A | 2/1998 | Taylor | |
| 5,727,147 A | 3/1998 | Van Hoff | |
| 6,757,769 B1 | 6/2004 | Ofer | |
| 6,854,111 B1 | 2/2005 | Havner et al. | |
| 7,512,748 B1 | 3/2009 | Mason et al. | |
| 7,730,472 B2 * | 6/2010 | Andersen et al. | 717/162 |
| 2003/0105796 A1 | 6/2003 | Sandri et al. | |
| 2003/0115580 A1 | 6/2003 | Arai et al. | |
| 2004/0015946 A1 | 1/2004 | Te et al. | |
| 2004/0117780 A1 * | 6/2004 | Sea et al. | 717/159 |
| 2005/0028157 A1 | 2/2005 | Betancourt et al. | |
| 2005/0102665 A1 | 5/2005 | Barta et al. | |
| 2006/0070053 A1 | 3/2006 | Andersen et al. | |
| 2006/0070076 A1 | 3/2006 | Ma | |
| 2006/0277542 A1 | 12/2006 | Wipfel | |
| 2007/0169113 A1 | 7/2007 | Moore et al. | |
| 2007/0277159 A1 * | 11/2007 | Wagner et al. | 717/136 |

(Continued)

FOREIGN PATENT DOCUMENTS

| | | |
|---|---|---|
| GB | 2421328 A | 6/2006 |
| GB | 2465785 B | 6/2010 |

OTHER PUBLICATIONS

United Kingdom "Combined Search and Examination Report under Sections 17 & 18(3)" dated Mar. 2, 2009.

(Continued)

*Primary Examiner* — Elias Mamo

(57) ABSTRACT

A computer system and a method are disclosed for use in automatically deploying an application program to execute with one or more library resources. The computer system includes a deployment unit which deploys the application program into a runtime execution environment. When a predetermined trigger condition is detected, the deployment unit clones a first library resource to create a clone, transforms the application to depend upon the clone and resolves the dependencies of the application using the clone. In one embodiment, the trigger condition relates to a pinning situation, whereby a library upon which the application program depends cannot be wired to the application program to resolve the dependency. Here, the clone now satisfies that dependency. In another embodiment, the trigger condition is a mandatory cloning property that requires the library to be cloned. The mandatory cloning property may also be user-specified through a user interface.

19 Claims, 11 Drawing Sheets

(56) References Cited

U.S. PATENT DOCUMENTS

| | | |
|---|---|---|
| 2008/0028392 A1 | 1/2008 | Chen et al. |
| 2008/0040392 A1 | 2/2008 | Sugishita |
| 2008/0052676 A1 | 2/2008 | Wookey |
| 2008/0168448 A1 | 7/2008 | Lewis |
| 2008/0189324 A1 | 8/2008 | Keller |
| 2010/0115506 A1* | 5/2010 | Ljungbjorn .................. 717/174 |
| 2010/0186013 A1 | 7/2010 | Harrop |

OTHER PUBLICATIONS

Combined Search and Examination Report under Sections 17 and 18(3), from Intellectual Property Office, dated Apr. 27, 2009, pp. 1-6.
Examination Report under Section 18(3), from Intellectual Property Office, dated Jan. 5, 2012, pp. 1-3.
USPTO Office Action for U.S. Appl. No. 12/609,315, dated Jun. 4, 2012.

* cited by examiner

COMPUTER SYSTEM AND METHOD FOR RESOLVING DEPENDENCIES IN A COMPUTER SYSTEM

CROSS REFERENCE TO RELATED APPLICATION(S)

This application claims the benefit of U.S. Provisional Application No. 61/164,053 filed on Mar. 27, 2009. This application also claims the benefit of UK Patent Application No. 0821774.7 filed on Nov. 28, 2008.

BACKGROUND

1. Technical Field

The present invention relates generally to the field of computers and computer systems. More particularly, the present invention relates to a computer system and to a method for resolving dependencies in a computer system.

2. Description of Related Art

Modern computing systems have become highly sophisticated and complex machines, which are relied upon to perform a huge range of tasks in all our everyday lives. These computer systems comprise a very large number of individual components and sub-systems that must all work together correctly. Thus, creating programs to execute on these systems is a difficult and challenging task. In particular, the application programs that run on these modern computing systems have become increasingly complex and are increasingly difficult to develop. This leads to very lengthy development and deployment cycles and/or leads to errors (e.g. crashes) when the computer systems execute the application programs under a live load and serving real users. It is therefore desired to improve the stability and reliability of such computer systems. Also, it is desired to reduce the workload which is involved in developing new applications to be used by such computer systems.

Modern computer systems usually depend upon a variety of libraries. One example is the popular Hibernate library, which is primarily used to map from Java classes to database tables (and from Java data types to SQL data types). In particular, Hibernate generates SQL calls to pass data into and out of database applications. Another example is the FreeMarker library. Yet another example is the JtaTransactionManager library, and there are many others.

These libraries may exist in multiple different versions. Often, the provider of the library will make changes and improvements to the library, and then release a newer version. Some application programs will then immediately make use of the new version. However, other application programs will not be compatible with the newer version and will instead still depend on an older version of the library. For example, one application will only function correctly with a current version of the Hibernate library, but another application will only function correctly with an earlier version of the Hibernate library and is not compatible with the current version. Thus, there is a difficulty in correctly satisfying the dependencies of an application by providing an appropriate version of the relevant library.

There is a complication in that several different applications may all share a single execution environment. For example, a plurality of applications will all execute on the same Java Virtual Machine (as opposed to each application having its own instance of the Java VM). This saves resources in the computer system but also creates further difficulties in correctly resolving the dependencies for all of these applications at the same time.

The exemplary embodiments have been provided with a view to addressing at least some of the difficulties that are encountered in current computer systems, whether those difficulties have been specifically mentioned above or will otherwise be appreciated by the person of ordinary skill in the art from the discussion herein. At least in some of the following exemplary embodiments it is now desired to provide an improved mechanism for resolving dependencies in a computer system.

SUMMARY

According to the present invention there is provided a computer system, a method and a computer-readable storage medium as set forth in the appended claims. Other, optional, features of the invention will be apparent from the dependent claims, and the description which follows.

The example embodiments of the present invention discussed herein concern the automatic deployment of an application program into a computer system. In particular, the exemplary embodiments of the present invention concern a mechanism to resolve the dependencies of an application program in relation to libraries and other resources of the computer system, so that the computer system will execute the application program correctly in combination with the library resources.

There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

Generally, a computer system is provided which deploys an application program into a runtime execution environment, so that the computer system may then execute the application program in combination with resources such as libraries. The computer system suitably includes a deployment unit which deploys the application program into the runtime execution environment. When a predetermined trigger condition is detected, the deployment unit clones a relevant library resource to create a clone, transforms the application to depend upon the clone and resolves the dependencies of the application using the clone.

In one aspect there is provided a computer system comprising a runtime execution environment arranged to execute a plurality of application programs with respect to a plurality of resources; and a deployment unit arranged to deploy the plurality of application programs into the runtime environment, wherein each of the application programs has a set of dependencies upon one or more of the plurality of resources and the deployment unit deploys each of the application programs according to the set of dependencies. In one embodiment the deployment unit comprises: a detecting unit which detects a trigger condition in relation to a first resource of the plurality of resources when deploying one of the application programs with respect to the first resource; a cloning unit which clones the first resource to create a first cloned resource, in response to the trigger condition being detected by the detecting unit; a transforming unit which transforms the dependencies of the application program to replace the dependencies on the first resource and instead with dependencies on the first cloned resource; and a resolving unit which creates a set of wirings between the application program and the plurality of resources upon which the application program depends, including creating wirings with the cloned first resource according to the transformed dependencies of the application program.

In one exemplary aspect, the detecting unit detects the trigger condition where the first resource upon which the application program depends is pinned by the wiring of another of the application programs. That is, in exemplary embodiment, the trigger condition relates to a pinning situation, whereby a library upon which the application program depends cannot be wired to the application program. This pinning situation arises such as where that first library is already wired to one version of a second library by the wiring of another application program. The first library now cannot be wired to another version of the second library. Here, the clone of the first library now satisfies that dependency, in that the clone of the first library can now be wired to the other version of the second library.

In one exemplary aspect, the resolving unit determines that one or more of the dependencies cannot be resolved successfully and returns to the detecting unit in a recursive loop until all of the dependencies of the application program have been successfully resolved. In one exemplary aspect, the detecting unit further detects the trigger condition where the cloning of the first resource has caused another of the resources to become pinned.

In one exemplary aspect, the deployment unit identifies one or more of the plurality of resources as being excluded resources which should not be cloned, and the detecting unit detects an exception condition when the first resource is one of the excluded resources. In one exemplary aspect, the detecting unit detects the exception condition when the first resource has a singleton property indicating that the first resource should not be cloned. In one exemplary aspect, a management tool is provided which reports the exception condition via a management interface. In one exemplary aspect, the management tool also marks the first resource as one of the excluded resources in response to user commands received via a user interface.

In one exemplary aspect, the detecting unit detects the trigger condition when the first resource is associated with a mandatory cloning property indicating that cloning of the resource is mandatory. That is, in one embodiment, the trigger condition is a mandatory cloning property that requires the library to be cloned. A management tool may be provided that associates the first resource with the mandatory cloning property in response to user commands received via a user interface. That is, the mandatory cloning property may also be user-specified through a user interface.

In one exemplary aspect, the application program comprises a plurality of bundles. Also, the resources comprise a plurality of bundles of equivalent format, such as OSGi bundles. The deployment unit suitable resolves the dependencies of the application program by creating a network of wiring between the bundles.

In one aspect, a method is provided for resolving dependencies in a computer system. The method suitably includes detecting a trigger condition in relation to a first resource provided on the computer system; creating a clone of the first resource; transforming a dependency of an application program on the first resource to instead depend on the clone; and resolving the dependency of the application program using the clone.

In one aspect, a method is provided of deploying an application program in a computer system. The method suitably comprises, inter alia, the steps of: installing the application program onto the computer system; resolving one or more bundles of the application program to satisfy a set of dependencies of the bundles with respect to a plurality of resources of the computer system, wherein the plurality of resources include the first resource; configuring the application program with respect to the plurality of resources according to configuration in each of the bundles; starting the bundles in a runtime execution environment of the computer system; and executing the application program in the runtime execution environment of the computer system in combination with the plurality of resources.

Generally, a computer-readable storage medium is provided having recorded thereon instructions which, when implemented by a computer system, cause the computer system to be arranged as set forth herein and/or which cause the computer system to perform the method as set forth herein. In one aspect, the computer-readable storage medium comprises a deployment unit which, in use, clones a relevant library resource to create a clone when a predetermined trigger condition is detected, transforms an application program to depend upon the clone and resolves the dependencies of the application using the clone.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed below, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION

The exemplary embodiments of the present invention will be discussed in detail in relation to Java, Spring, OSGi and so on. However, the teachings, principles and techniques of the present invention are also applicable in other exemplary embodiments. For example, embodiments of the present invention are also applicable to other virtual machine environments and other middleware platforms, which will also benefit from the teachings herein.

Figure 1:
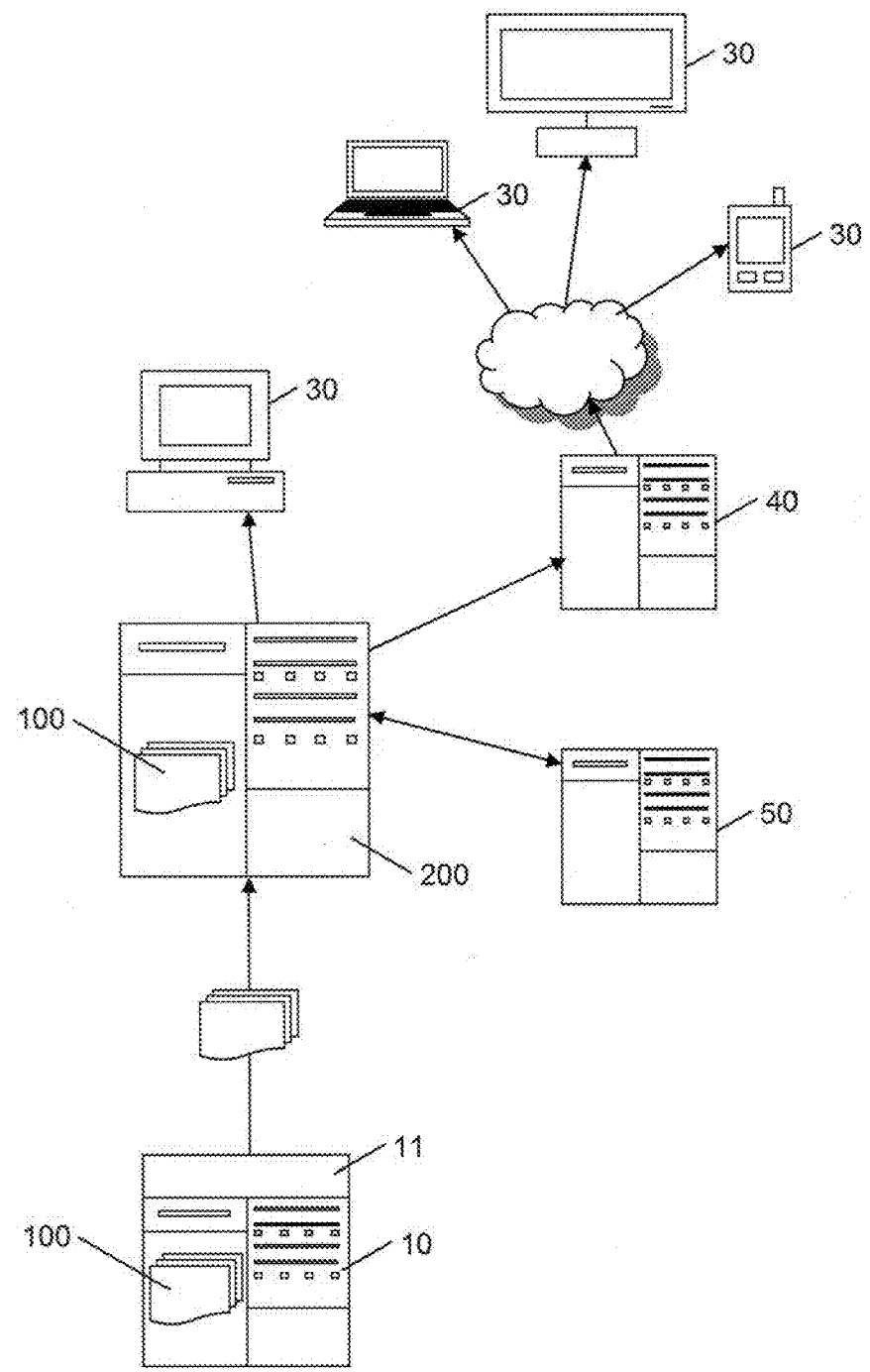
FIG. 1 is a schematic overview of an example computer network in which the exemplary embodiments may be used.

FIG. 1 is a schematic overview of an example computer network in which the exemplary embodiments discussed herein are applied. An application program 100 is developed on a development system 10 and is tested by a variety of testing tools 11. The finished application 100 is then deployed onto one or more host computer systems 200, using a suitable deployment mechanism The application 100 runs (executes) on the host computer system 200 and, in this example, serves one or more individual end-user client devices 30 either over a local network or via intermediaries such as a web server 40. When running the application 100, the host computer system 200 will often communicate with various other back-end computers such as a set of database servers 50. FIG. 1 is only an illustrative example and many other specific network configurations will be apparent to those skilled in the art.

The application program 100 is typically developed using object-oriented programming languages, such as the popular Java language developed by Sun Microsystems. Java relies upon a virtual machine which converts universal Java bytecode into binary instructions in the instruction set of the host computer system 200. More recently, Java 2 Standard Edition (J2SE) and Java 2 Enterprise Edition (JEE or J2EE) have been developed to support a very broad range of applications from the smallest portable applets through to large-scale multilayer server applications such as complex controls for processes, manufacturing, production, logistics, and other industrial and commercial applications.

Figure 2:
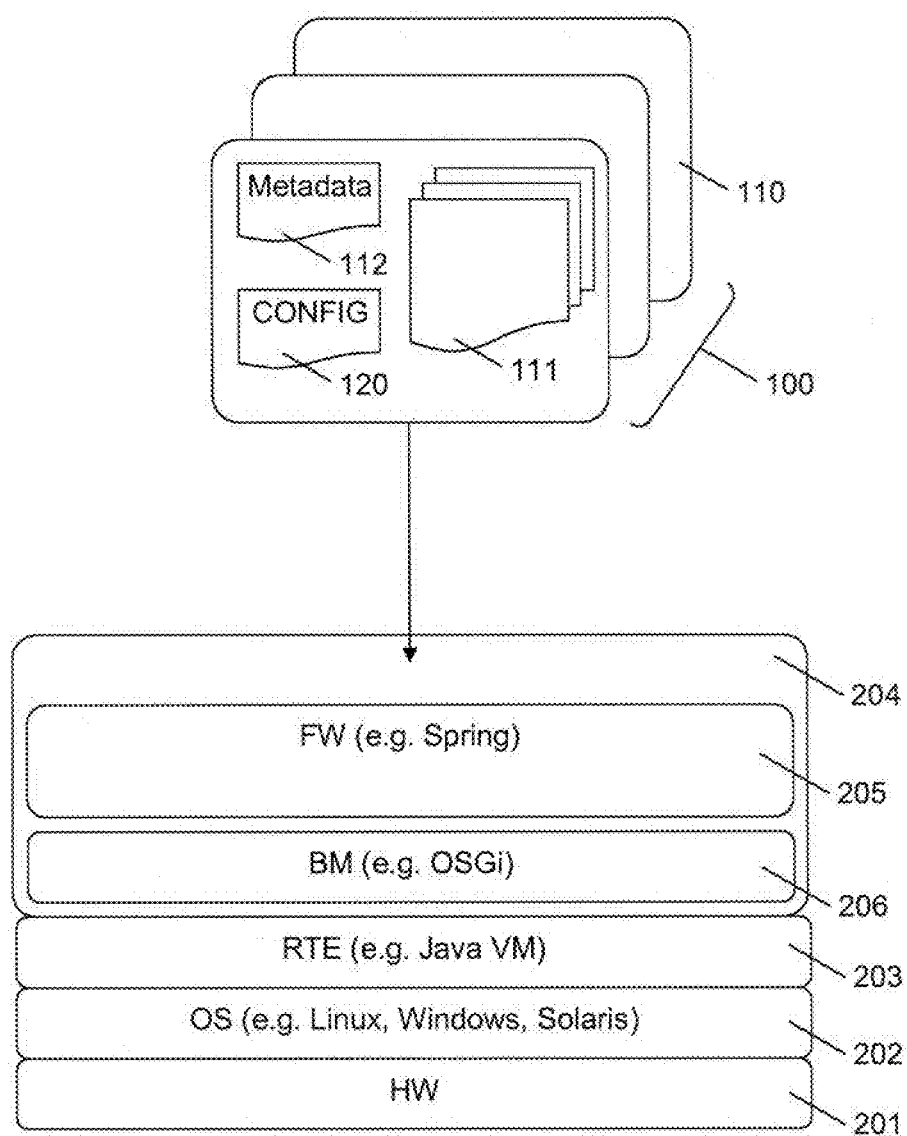
FIG. 2 is a schematic overview of a computer system according to an exemplary embodiment.

FIG. 2 is a schematic overview of a computer system 200 according to an exemplary embodiment of the present invention. In this example, the host computer system 200 includes physical hardware (HW) 201 such as memory, processors, I/O interfaces, backbone, power supply and so on as are found in, for example, a typical server computer; an operating system (OS) 202 such as Windows, Linux or Solaris; and a runtime environment (RTE) 203 such as Microsoft.NET or Java (e.g. Hotspot or Java 1.5). The runtime environment 203 supports a multitude of components, modules and units that coordinate to perform the actions and operations that are required of the computer system 200 to support execution of the application program 100.

In the exemplary embodiments, the host computer 200 also includes a middleware layer (MW) 204. This middleware layer 204 serves as an intermediary between the application program 100 and the underlying layers 201-203 with their various different network technologies, machine architectures, operating systems and programming languages. In the illustrated example, the middleware layer 204 includes a framework layer 205, such as a Spring framework layer. Increasingly, applications are developed with the assistance of middleware such as the Spring framework. The application 100 is then deployed onto the host computer system 200 with the corresponding framework layer 205, which supports the deployment and execution of the application 100 on that computer system 200.

The application 100 is conveniently formatted as a plurality of bundles 110. In general terms, a bundle is a packet, module or other subdivision comprising one or more portions of computer code (classes) which form part of an application program. Typically, the code in one bundle 110 will rely upon code in one or more other bundles 110 for proper execution of the application program 100. Thus, the bundles 110 are semi-independent collections of computer code but which are interdependent upon one another as part of a larger application. In this example, at least some of the bundles 110 comprise one or more classes 111 which are grouped into one or more logically related packages. Conveniently, the Spring framework layer 205 allows the application 100 to be based mostly on Plain Old Java Objects (POJOs).

Typically, the application program 100 is released from the development system 10 (see FIG. 1) with each of the bundles 110 in the form of a compressed ZIP or JAR (Java archive) file ready to be deployed on the host computer system 200. Other examples include WAR (web archive) files and EAR (enterprise archive) files. Here, each bundle 110 includes a metadata unit 112, such as a manifest (e.g. the manifest file META-INF/MANIFEST.MF), that gives metadata about the bundle 110 and/or about the classes 111 contained in that bundle 110.

In the illustrated example, the framework layer 205 includes or is coupled to a bundle management layer (BM) 206 such as an OSGi Module Layer that manages the bundles 110. Here, the bundle management layer 206 assists in managing the installation and update of the bundles 110 in an OSGi environment in a dynamic and scalable fashion.

However, those skilled in the art will appreciate that the illustrated example is merely one of many possibilities and that other specific arrangements will be appropriate in other implementations. For example, another exemplary embodiment is based instead on the Java Enterprise Edition (JEE) environment, which uses bundles ("modules") compliant with JSR 277.

As shown in FIG. 2, the application 100 also comprises a configuration 120. As one example, the configuration 120 is written in the XML markup language and is optionally formatted according to a predetermined schema.

In the example embodiment, the framework layer 205 defines beans (e.g. Spring beans) which represent dependencies of the application 100 upon resources that are provided by the runtime environment 203 of the host computer system 200. These Spring beans, the dependencies, and the services needed by the beans are specified by the configuration 120. Also, those skilled in the art will appreciate that the configuration 120 is often divided into a plurality of separate sections and is distributed in various different parts of the application. Thus, in practical embodiments, the configuration 120 may be provided as a collection of separate configuration sections.

Figure 3:
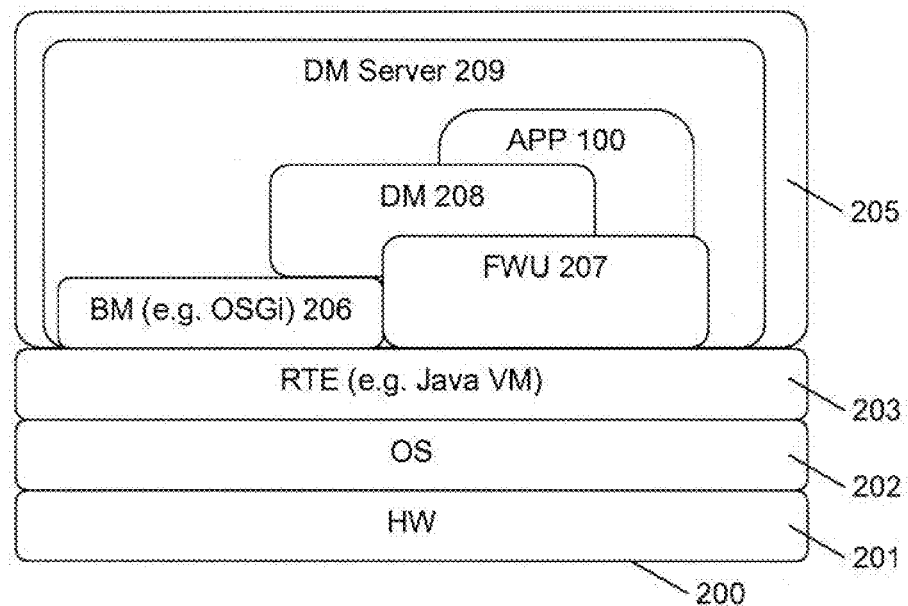
FIG. 3 is a schematic diagram illustrating a system architecture of the computer system in more detail.

FIG. 3 is a schematic diagram illustrating a system architecture of the computer system 200 in more detail. Here, the framework layer 205 comprises a framework unit (FWU) 207 such as a Spring framework unit, a dynamic module unit (DM) 208 and a dynamic module server 209.

In the exemplary embodiments, the framework layer 205 is closely integrated with the bundle management layer 206. In particular, the framework layer 205 provides additional functions for bundle management in cooperation with the bundle management layer 206, as will be discussed below. The dynamic module unit 208 provides the bundles 110 in the form of dynamic modules. The dynamic module server 209 supervises and manages the bundles 110 as dynamic modules and, amongst other functions, controls deployment of the bundles 110 into the virtual machine execution environment 203 with the assistance of these other components of the framework layer 205.

Figure 4:
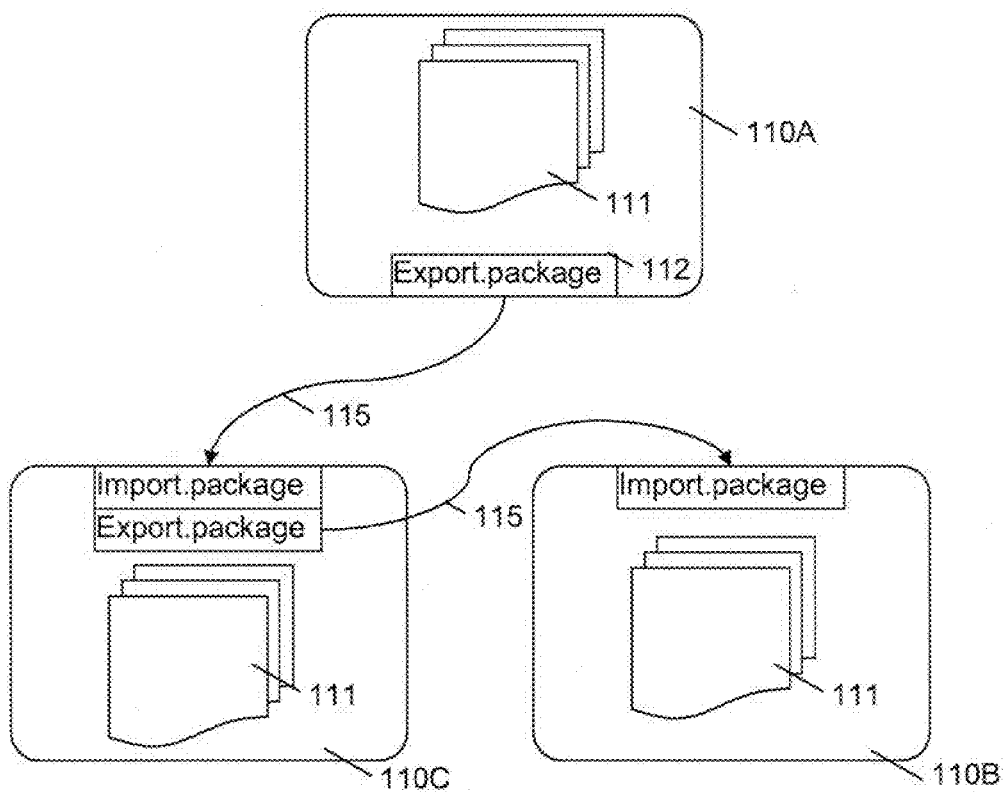
FIG. 4 is a schematic diagram illustrating the computer system in more detail in a process of deploying an application.

FIG. 4 is a schematic diagram illustrating the computer system 200 in more detail in a process of deploying an application.

In general terms, the process of deploying the application 100 on the computer system 200 suitably comprises the steps of installing the application 100 onto the computer system as a plurality of bundles 110, resolving each of the installed bundles 110 to satisfy dependencies with resources provided within the computer system 200 and starting each of the resolved bundles 110 for execution in the runtime execution environment 203.

FIG. 4 shows three of the bundles 110 and illustrates a plurality of dependencies that arise between the bundles 110. These dependencies are resolved by creating a network of wiring 115 between the bundles 110. That is, each dependency is resolved by creating a wire between a respective pair of the bundles 110. In other words, the framework layer 205 is arranged to resolve the bundles 110, which includes creating the network of wiring 115 between the bundles 100.

Under the OSGi environment, each bundle 110 has a managed lifecycle that follows well-defined stages. Initially, the bundle 110 is INSTALLED in the computer system 200. Then, the bundle 110 is RESOLVED by satisfying the dependencies of the bundle. When all of the dependencies have been resolved (satisfied), the relevant bundles 110 are started to become ACTIVE. The classes 111 in those bundles 110 may then execute in the virtual machine execution environment 203 as part of the application 100. Later, the bundle 110 may be stopped and returned to the RESOLVED state. Later still, the bundle 110 may be UNINSTALLED from the system 200.

As noted above, each bundle 110 of the application 100 comprises classes 111 of the application 100 which together make the computer system 200 perform useful functions for the end users. In the exemplary embodiments, the bundles 110 share packages (i.e. Java packages) of the classes 111 from an exporter bundle to an importer bundle in a well-defined manner. Thus, the many bundles 110 that together make up a single application 100 often share packages and therefore create dependencies between the bundles 110. In the OSGi Service Platform, these bundles 110 are the only entities for deploying Java-based applications. The manifest file 112 describes the content of this bundle 110 and provides information about the bundle 110. This manifest file 112 suitably uses headers to provide information that the framework layer 205 then uses to install the bundle 110 correctly and activate the bundle. For example, the manifest file 112 states dependencies on other resources, such as the packages in other bundles 110, that must be available to the bundle 110 before it can run. Here, the bundles 110 use Export.Package statements in the header of the manifest file 112 to export a package from the exporter bundle 110A and a corresponding Import.Package statement 112 to import that package into the importer bundle 110B.

Each wiring 115 is a connection between the exporter bundle 110A that exports a package of classes 111 and the respective importer bundle 110B that imports that package. Each importer bundle 110B is wired to the corresponding exporter bundle 110A as a process of satisfying constraints, which are associated with the wiring 115. That is, each wiring 115 is associated with a number of constraints (such as version matching constraints and package constraints), that are defined by manifest headers in the manifest 112 of the respective importer and exporter bundles 110. In other words, the resolving step produces a wiring datastructure of nodes (bundles) and links (wires), wherein each link is associated with one or more constraints. A valid wire is a wire that has satisfied all of its constraints. For completeness, the bundle 110C is shown acting both as an exporter and as an importer. The wiring network 115 may thus become intricate and complex as the packages are shared between the bundles 110 in a practical computer system. Here, the OSGi bundle management layer 206 suitably includes a Package Admin service that provides an interface which reports useful information concerning the shared packages, the exporting bundles and the importing bundles. This information may then be obtained by a Management Agent. Also, the Package Admin service provides a public interface (i.e. org.osgi.service.packageadmin) that allows other components to inspect the package wiring state of the bundles. The public interface of the Package Admin service also allows inspection of other functions related to a class loader network among the bundles.

Figure 5:
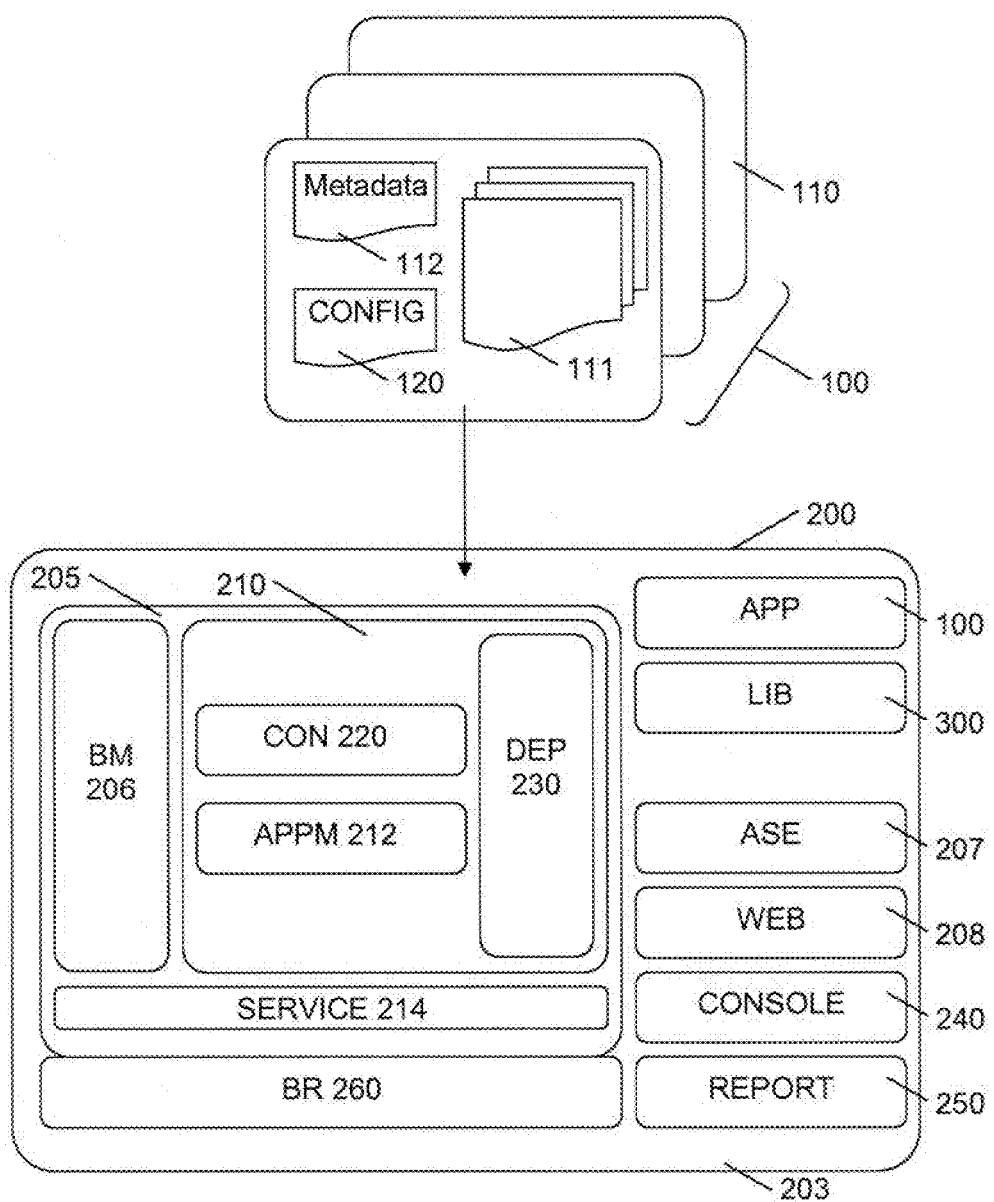
FIG. 5 is a schematic diagram showing various components within a runtime environment of the exemplary computer system in more detail.

FIG. 5 is a schematic diagram illustrating components within the runtime execution environment 203 of the computer system 200 in more detail, particularly in relation to an exemplary embodiment of the framework layer 205.

As noted above, the runtime environment 203 includes the exemplary Spring framework layer 205 which in turn includes the OSGi bundle management layer 206. Also, this example includes a front-end application server environment (ASE) 207 such as Tomcat, and a Web support unit 208 which supports the application 100. Other units such as a WAR support unit (not shown) are provided, according to the specific needs of the runtime environment as will be familiar to those skilled in the art.

As shown in FIG. 5, in this example the computer system 200 further includes a framework kernel 210, an application management unit (APPM) 214, and a serviceability unit (SERVICE) 218. The serviceability unit 218 suitably performs a variety of service tasks including Trace, Logging, First Failure Data Capture (FFDC), Asserts and Aspects as will be familiar to those skilled in the art. Further, the framework layer 205 comprises a configuration unit (CON) 220, and a deployment unit (DEP) 230, which will be discussed in detail below.

As also shown in FIG. 5, the exemplary computer system 200 further comprises a management console unit (CONSOLE) 240, a reporting unit (REPORT) 250, a bundle repository (BR) 260, and at least one third-party resource 300 such as a library (LIB), which again will be discussed in detail below.

The bundle repository 260 conveniently comprises several hundred third-party libraries that are commonly required when developing applications using the framework layer 205. The bundle repository 260 suitably provides these libraries for general use in the form of bundles (i.e. in a form equivalent to the bundles 110 of the application 100). Most conveniently, the libraries are provided as OSGi bundles. The library bundles from the bundle repository 260 are readily brought into the runtime environment 203 when needed as a resource by the application 100. The kernel 210 provisions the library bundles from the bundle repository 260 on demand through the bundle management layer 206. In FIG. 5, this is represented by the library 300 as an active resource within the runtime environment ready to satisfy a dependency of the application 100. Conveniently, the bundle repository 260 minimizes a memory footprint of the framework layer 205 within the runtime environment 203, thus leaving more resources of the computer system 200 available for use by the application 100.

As noted above, the libraries 300 are often provided by third parties and are thus not directly under the control of the application 100. In this open environment, the configuration 120 enables the application 100 to interact with these third party resources 300. Although the libraries 300 are a prime example of such third party resources, there are other resources upon which the application 100 will depend. For example, the application 100 will often depend upon resources provided within the execution environment 203, such as the resources that are provided within Java 5 or Java 6.

The configuration unit 220 configures the application 100 ready for deployment by the deployment unit 230. The deployment unit then deploys the configured application into the runtime environment 203 including satisfying the dependencies of the application with the third-party libraries 300. More particularly, the configuration unit 220 is arranged to configure the plurality of bundles 110 into a configured form ready for deployment by the deployment unit 230. The deployment unit 230 then deploys the configured application bundles 110 into the runtime environment 203, including satisfying the dependencies of the bundles 110 with the relevant resources 300.

Figure 6:
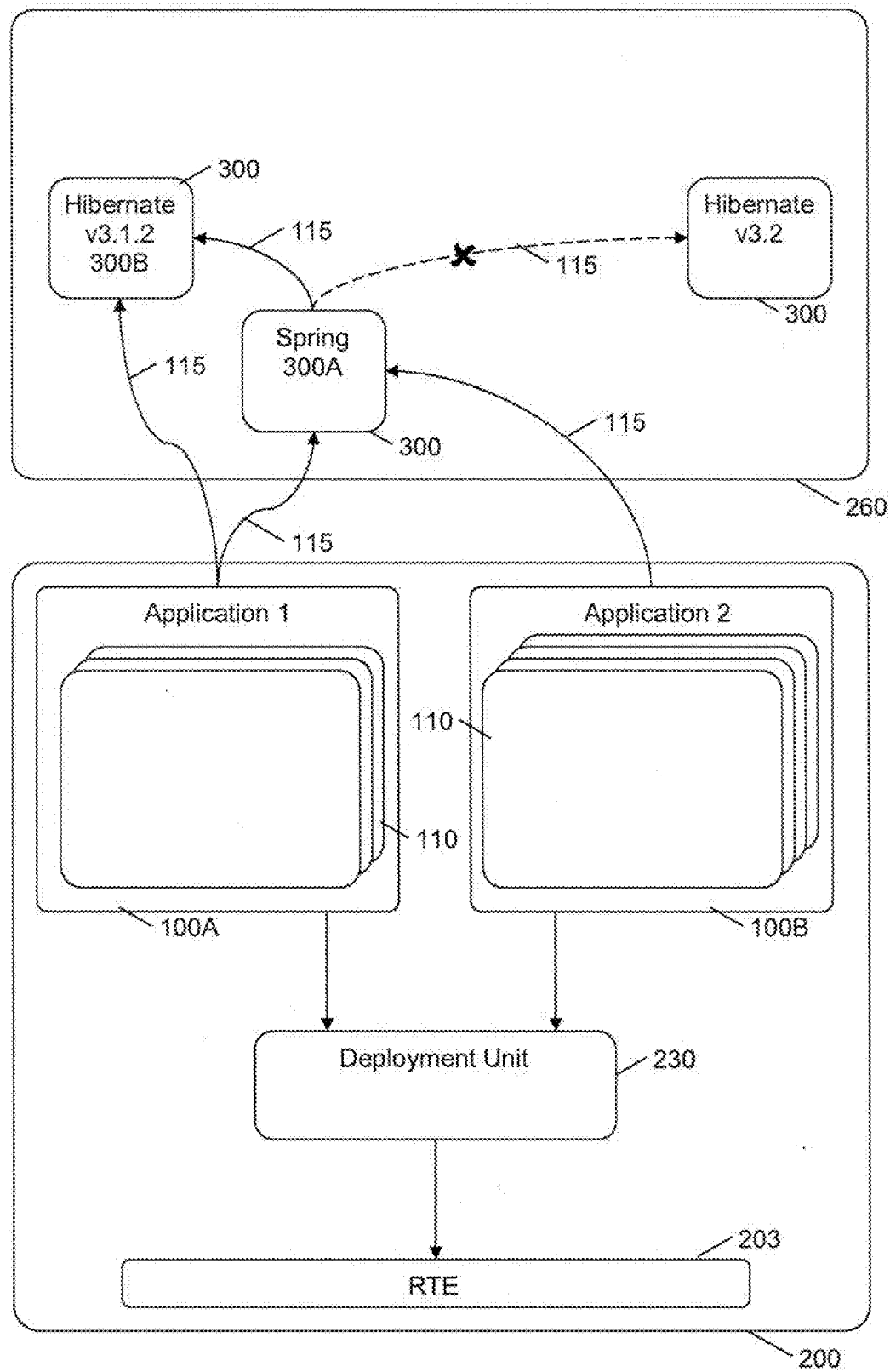
FIG. 6 is a schematic diagram showing the computer system in more detail in a process of resolving an application.

FIG. 6 is a schematic diagram showing the computer system in more detail in a process of resolving an application.

In particular, FIG. 6 shows an example situation that will often occur when deploying two applications 100A & 100B onto the computer system 200 through the deployment unit 230. In practical embodiments, the different applications 100A &100B share a single instance of the runtime execution environment 203 of FIG. 3 (i.e. a single Java VM). A difficulty arises in that one application 100A can pin the resources 300 that are needed by another application 100B. This pinning arises due to the dependencies. Thus, a mechanism is now provided which assists in resolving an application 100A & 100B whilst avoiding pinning of the resources 300.

Here, the first application 100A has a dependency upon two libraries 300, such as a Spring library 300A and a Hibernate library 300B. As a result, the deployment unit 230 creates a wiring 115 between the first application 100A and the two libraries 300A & 300B. Also, an inter-resource dependency arises between the two libraries, in that the first library Spring 300A depends on the second library Hibernate 300B. In response, the deployment unit 230 likewise resolves the inter-library dependency by causing a corresponding wiring 115 to be created between the libraries 300A & 300B. As discussed above, in the exemplary embodiments the wiring 115 is created by forming one or more wires between respective OSGi bundles 110 in the applications 100 and in the libraries 300. That is, the deployment unit 230 may delegate to the OSGi bundle management layer 206 to create the wiring 115.

Many different versions of the same resource 300 may exist within the computer system 200, for example because the libraries 300 are often updated. Thus, the bundle repository 260 may contain both Hibernate version 3.1.2 and Hibernate version 3.2. In FIG. 6, the deployment unit 230 has successfully deployed the first application 100A onto the computer system 200, wherein the first application 100A depends upon a first version of the second library 300B, such as Hibernate version 3.1.2 in this example. Meanwhile, the deployment unit 230 now attempts to deploy the second application 100B, which instead has a dependency on Hibernate v3.2.

As also shown in FIG. 6, the second application 100B likewise gives rise to an inter-library dependency between Spring and Hibernate. However, in this case there is a difficulty in resolving the dependencies of the second application 100B, because the first library Spring 300A is already wired to another version (v3.1.2) of the second library Hibernate 300B. That is, the first library Spring 300A is effectively pinned to the first version (v3.1.2) of the second library Hibernate 300B by the current wiring 115. At this stage, the application 100B cannot be successfully deployed into the runtime execution environment 203 on the computer system 200 in combination with the first application 100A.

Figure 7:
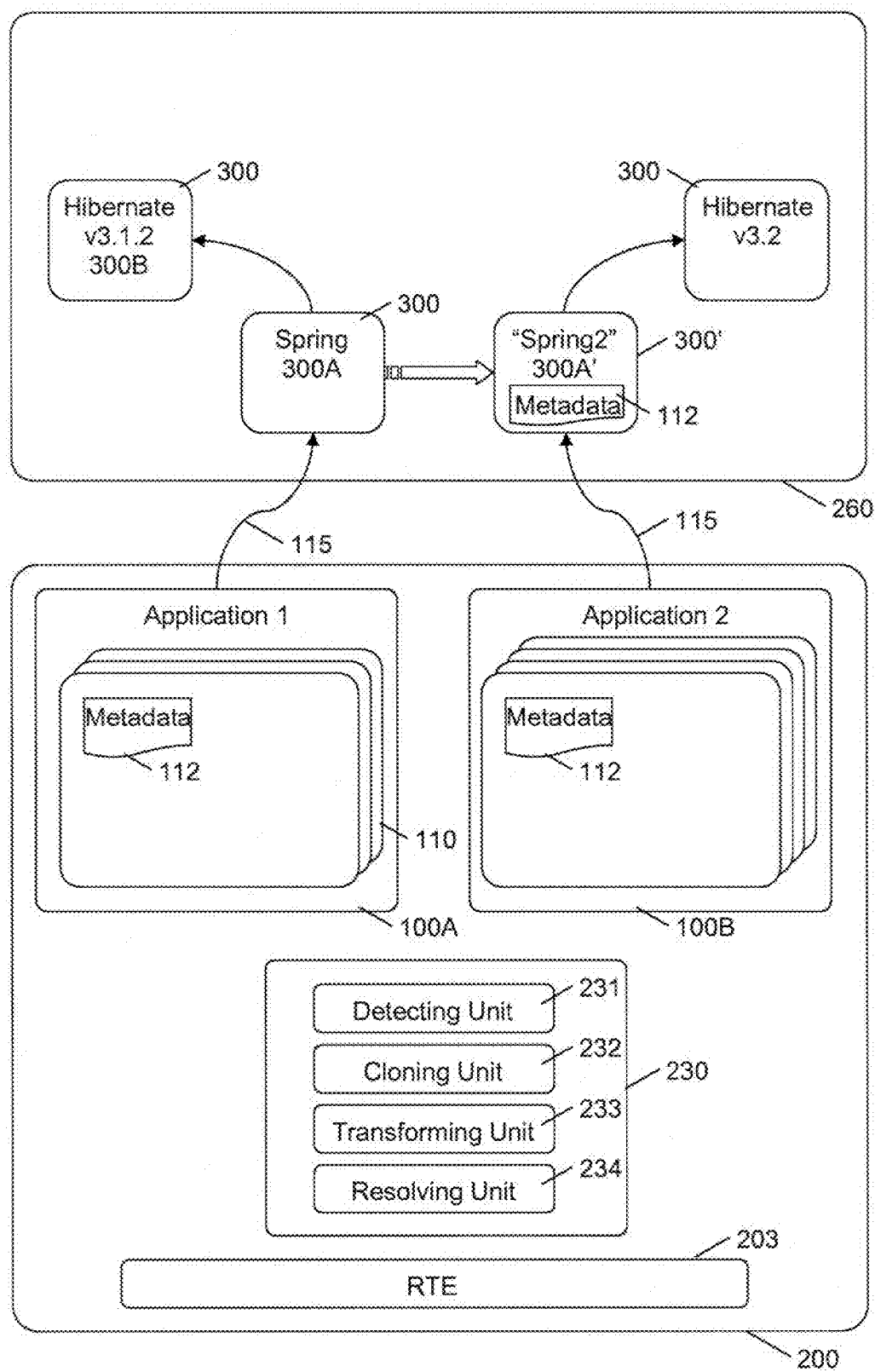
FIG. 7 is a schematic diagram showing the computer system in more detail.

FIG. 7 is another schematic diagram showing the computer system in more detail in a process of resolving an application. In particular, FIG. 7 shows components of the deployment unit 230 in more detail.

In FIG. 7, the deployment unit 230 comprises a detecting unit 231, a cloning unit 232, a transforming unit 233 and a resolving unit 234.

That is, the detecting unit 231 detects a trigger condition wherein a required resource 300A is already wired to a second resource 300B by the wiring of another application 100A. In other words, the detecting unit 231 detects a trigger condition wherein one or more of the resources 300 upon which an application 100B depends is already pinned by another application 100A.

Continuing with the same example situation as discussed above, in FIG. 7 the detecting unit 231 detects that the dependencies of the second application 100B cannot be resolved due to pinning of the Spring library 300A by the first application 100A. In the exemplary embodiments, the detecting unit 231 consults a Package Admin service of the OSGi Module Layer 206 (see FIG. 3) to determine the existing wirings 115 of the required resources 300, and compares these wirings 115 against the dependencies of the new application 100B to be deployed.

Where the detecting unit 231 detects that the trigger condition has been met then, in response, the cloning unit 232 clones the pinned resource 300A to create a clone of the pinned resource 300N. Here, the cloning unit 232 clones the pinned first library Spring 300A to create a second instance of the Spring library 300A'. Suitably, the cloning unit 232 copies and renames the pinned library to form the clone. In the exemplary embodiments, this may be done by copying and renaming the relevant bundles 110 in the bundle repository 260 to form a new library. In this way, the cloning unit 232 clones a new "Spring2" library 300A' from the original "Spring" library 300A.

The transforming unit 233 now transforms the second application 100B to depend instead on the newly cloned resource Spring2 300A'. That is, the transforming unit 233 amends the dependencies declared by the second application 100B to instead depend on the new clone 300A'. For example, the transforming unit 233 rewrites the Import.Package statements in the metadata 112 of the bundles 110 of the second application 100B to instead depend on "Spring2" 300A'.

The resolving unit 234 then resolves the transformed application 100B based upon the dependencies to the clone resource 300A'. Here, the second application 100B now has dependencies on "Spring2" 300N and Hibernate v3.2 300B, which are resolved correctly without conflict with the first application 100A. The resolving unit 234 now successfully resolves these dependencies by creating the wiring 115, which now includes valid wires between the respective resources 300N & 300B. In the exemplary embodiment, the relevant resolved bundles 110 may now be started in the execution environment 203.

Figure 8:
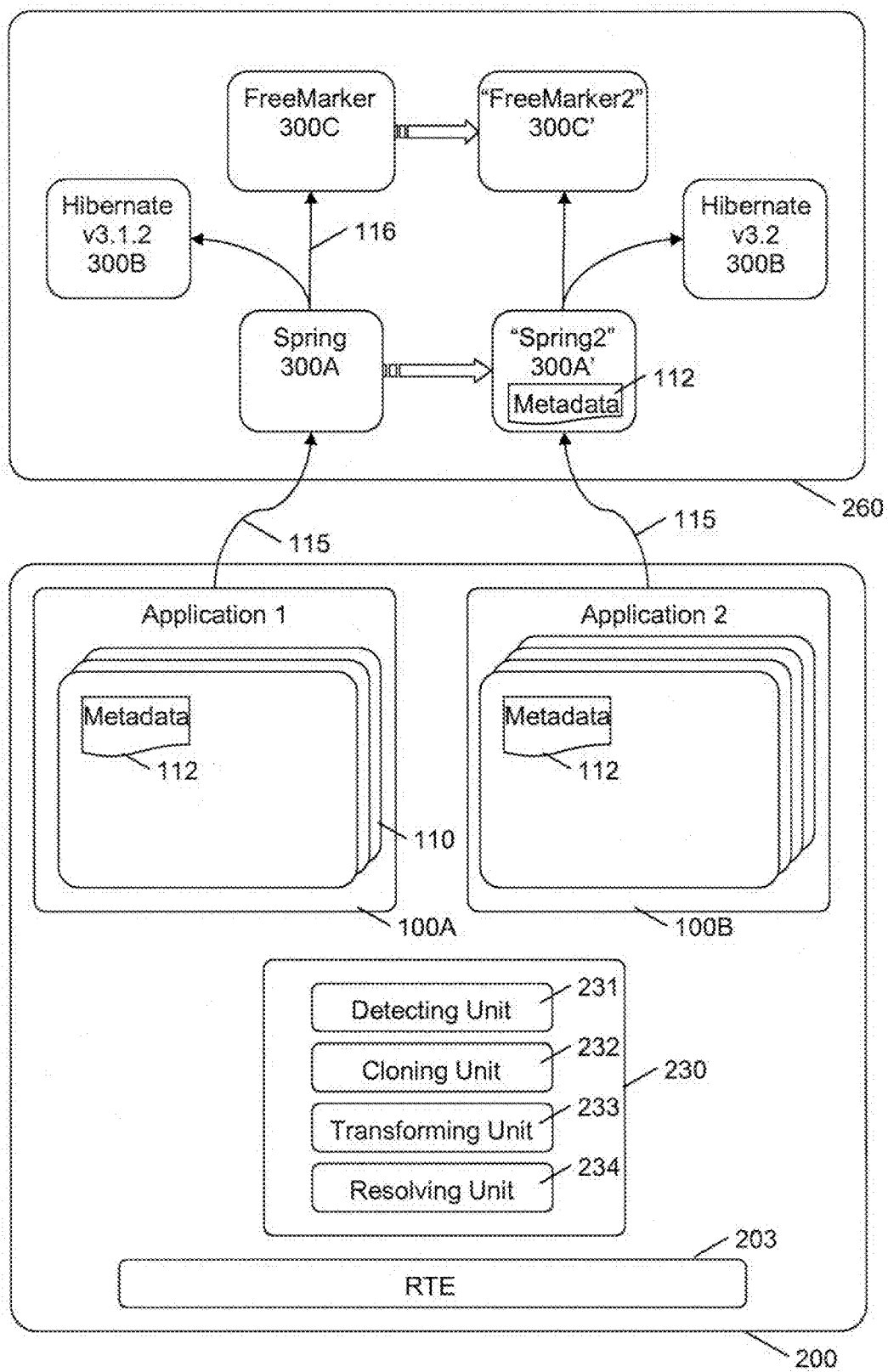
FIG. 8 is a further schematic diagram showing the computer system in more detail.

FIG. 8 is a further schematic diagram showing the computer system in more detail in a process of resolving an application. In particular, FIG. 8 shows another aspect of the deployment unit 230 in more detail.

In FIG. 8, the deployment unit 230 is arranged to recursively detect, clone, transform and resolve the application until all of the dependencies are successfully resolved.

Here, the cloning process performed by the cloning unit 232 may, in some circumstances, cause one of the resources 300 to become pinned. In which case, the resolving unit 234 fails to resolve the corresponding dependencies. Hence, in the exemplary embodiments, the detecting unit 231 is further arranged to detect a trigger condition wherein one or more of the resources is pinned by cloning the and the operations described above relating to FIG. 7 are repeated. That is, FIG. 8 continues with the same components as already described above for FIGS. 6 & 7. However, in this case the first application 100A also has a dependency upon a third resource 300C such as the popular FreeMarker library, which creates a wiring from the first library 300A to the third library 300C. The second application 100B likewise has a dependency on the same third library FreeMarker 300C via Spring. Now, cloning the first library 300A to produce the clone "Spring2" 300A' as described above causes pinning, in that the third library 300C is pinned by the first application 100A to the first library 300A. The detecting unit 231 detects that the third library 300C is pinned and so cannot be wired to the clone "Spring2" 300N. In response, the cloning unit 232 now clones the pinned third library FreeMarker 300C to create another clone "FreeMarker2" 300C'. As noted above, the transforming unit 233 again transforms the application 100B (and in this case also the clone of the first library "Spring2" 300A') to depend instead on the newly cloned third library "FreeMarker2" 300C'. The resolving unit 234 now successfully resolves the second application 100B with respect to these cloned resources, namely the cloned first library "Spring2" 300A' and the cloned third library "FreeMarker2" 300C'. In the exemplary embodiment, the relevant bundles 110 are wired and then started, and the application 100B may execute in the runtime execution environment 203.

Figure 9:
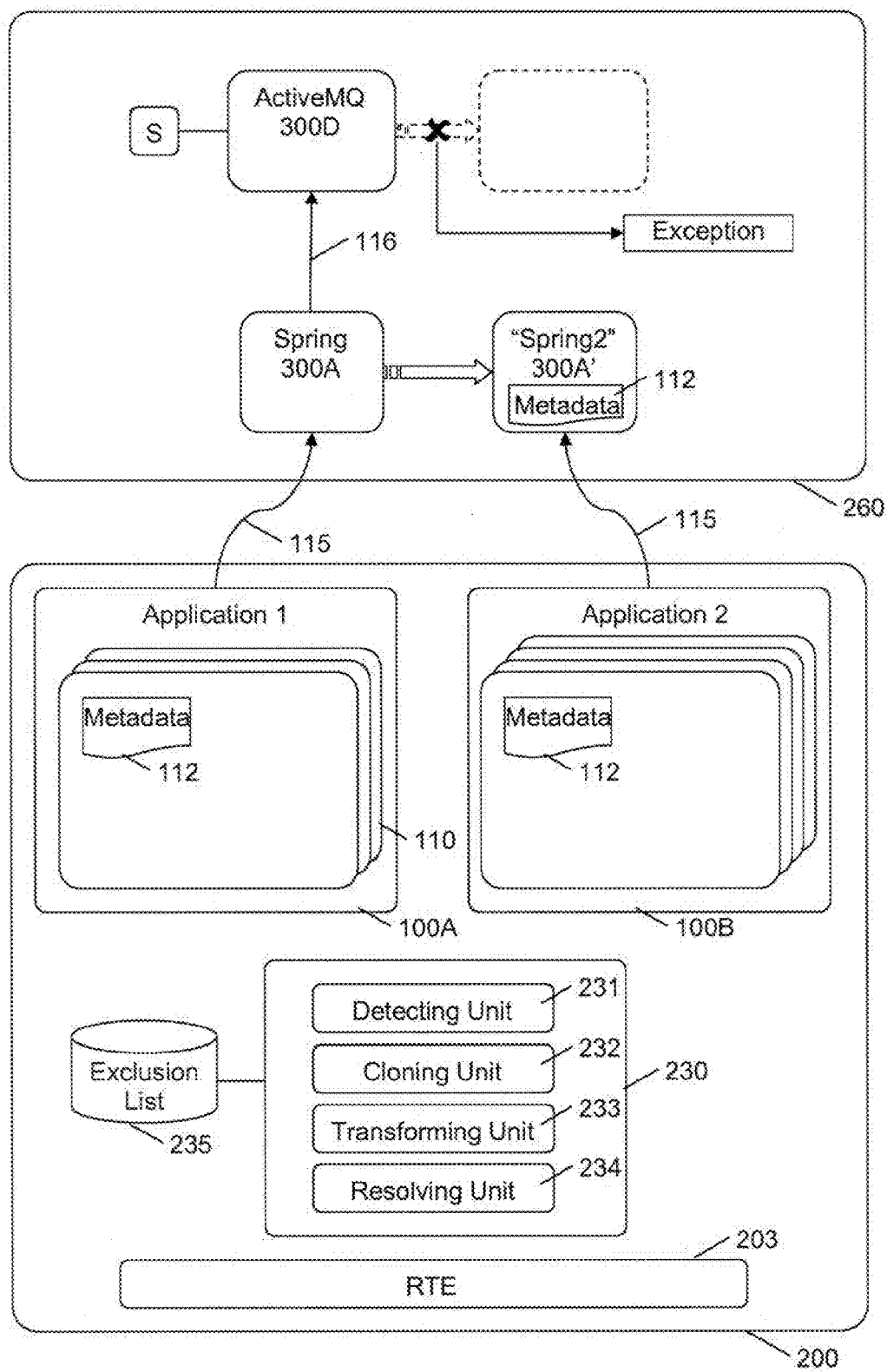
FIG. 9 is a schematic diagram showing further aspects of the computer system in more detail.

FIG. 9 is another schematic diagram showing the computer system in more detail in a process of resolving an application. In particular, FIG. 9 shows still other aspects of the exemplary deployment unit 230.

It has been found that some resources 300 cannot be cloned as described above. Therefore, the deployment unit 230 suitably further detects an exception condition as an exception to the trigger condition. That is, even when the trigger condition is satisfied, the exception condition prevents the deployment unit 230 from continuing with resolving this dependency in the deployment of the application.

FIG. 9 highlights a specific example in relation to a singleton library resource 300D. As an example, a singleton library 300D such as ActiveMQ binds to specific resources in the computer system, such as certain IP ports. Thus it is not possible to run two instances of ActiveMQ 300D simultaneously. Thus, the exemplary computer system associates one or more of the resources 300 with a singleton property S as shown in FIG. 9.

Should one of these singleton libraries 300D be detected as being pinned (and thus the trigger condition is true), then in this case the exception condition is also true. In response, the cloning, transforming and resolving processes discussed above are not performed by the cloning unit 232, etc. Instead, the deployment unit 230 raises an exception. Suitably, the exception passes through the serviceability unit 218 (see FIG. 5) and is reported via a management interface provided by the management console 240. The cause of the exception may be logged, and then investigated using the reporting unit 250.

The deployment unit 230 suitably stores an exclusion list 235 of such singleton libraries 300D having the singleton property S and the detecting unit 231 detects an exception condition where the library 300D is pinned as described above but is also on the exclusion list 235. The library 300D may itself declare such a singleton property, such as in the manifest 112 of the bundles 110 for this library. In a further embodiment, the reporting unit 250 provides a user interface that allows the user to inspect the exclusion list 235 held by the deployment unit 230. Also, the management console 240 may provide a tool that adds a resource from the plurality of resources 300 to the exclusion list 235 in response to a user command received via the user interface. That is, the exclusion list 235 is optionally user-specified.

Figure 10:
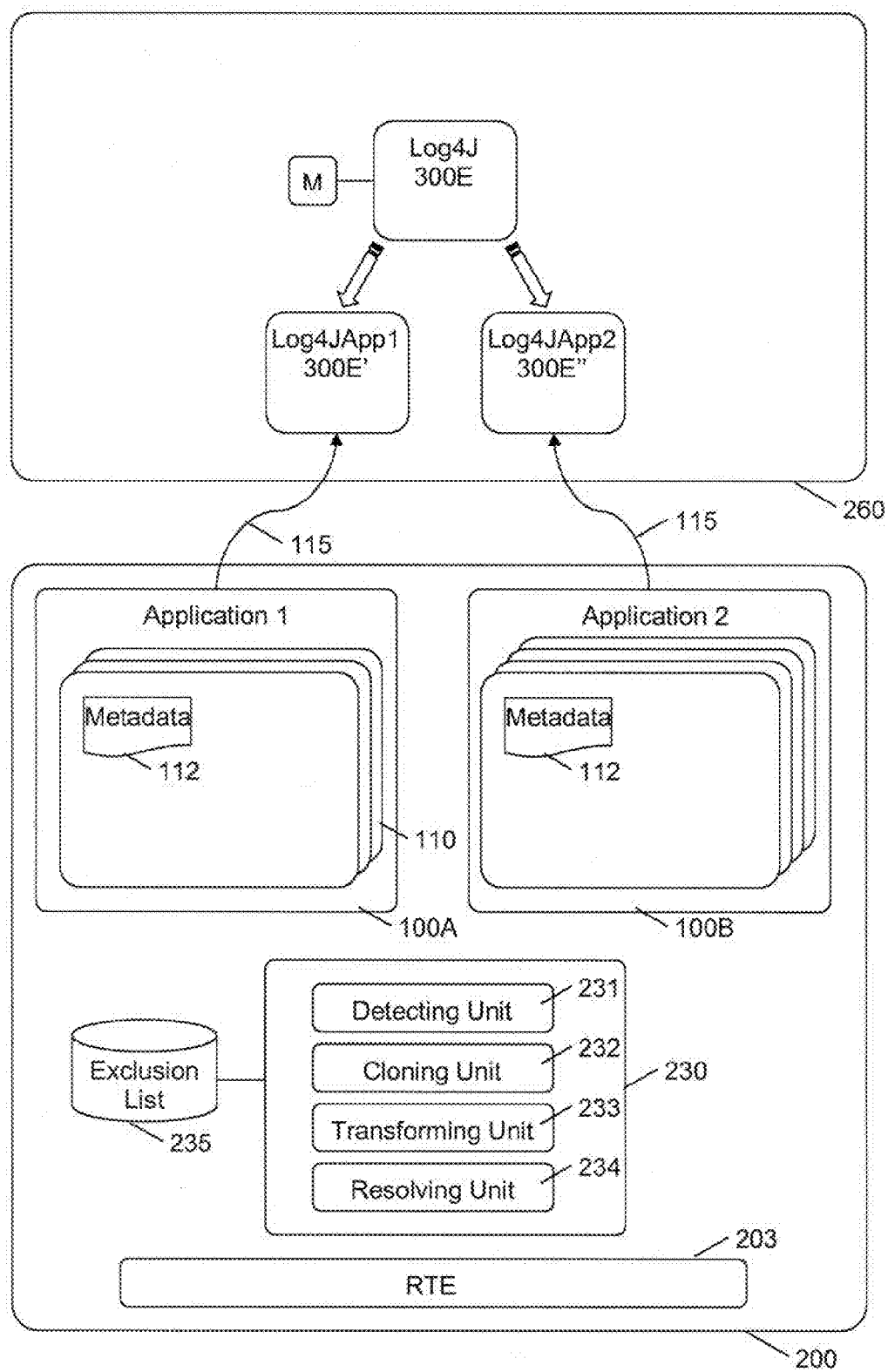
FIG. 10 is a schematic diagram showing further aspects of the computer system in more detail.

FIG. 10 is another schematic diagram showing the computer system in more detail in a process of resolving an application. In particular, FIG. 10 shows further aspects of the exemplary deployment unit 230.

It has been found that some of the resources 300 will benefit from always being cloned. That is, the exemplary computer system 200 optionally associates one or more of the resources 300 with a mandatory cloning property M. The library 300E may itself declare the mandatory cloning property M, e.g., in the manifest 112 of the bundles 110 for this library. Also, the management console 240 may provide a tool that associates a resource 300E from the plurality of resources 300 with the mandatory cloning property M in response to a user command received via the user interface. That is, the mandatory cloning trigger condition is optionally user-specified for one or more of the library resources 300.

As one example, the Log4J library 300E is a popular logging utility for Java, which produces a log of important events in relation to a particular application 100 being logged. Here, it is advantageous to deploy each application 100 with a corresponding private copy of the Log4J library 300E. The exemplary deployment unit 230 allows such private copies to be created easily, even when the applications 100 are deployed as multiple bundles 110 as in the exemplary embodiments discussed herein. In particular, the relevant dependencies of each application 100 may now be resolved with the private copy of this library resource 300E.

In the exemplary embodiment, the detecting unit 231 is arranged to detect a trigger condition wherein the resource 300E has the mandatory cloning property. When this trigger condition is satisfied then, as described above, the detecting unit 231 causes the cloning unit 232 to clone the relevant resource 300E, the transforming unit 233 transforms the application 100 to depend upon the clone 300E', and the resolving unit 234 resolves the dependency of the transformed application with respect to the private clone 300E'. In the illustrated example, the original Log4J library 300E is used to create the clone "Log4JApp1" 300E' for the first application 100A. Similarly, the second application 100B, which likewise has a dependency on Log4J, is resolved by providing a corresponding private clone such as "Log4JApp2" 300E".

This example embodiment may also be combined with the embodiments that have already been described above. In one exemplary arrangement, the detecting unit 231 is arranged to test for the first trigger condition in relation to pinning and/or the second trigger condition in relation to mandatory cloning, and then also test for the exception condition in relation to excluded resources.

Figure 11:
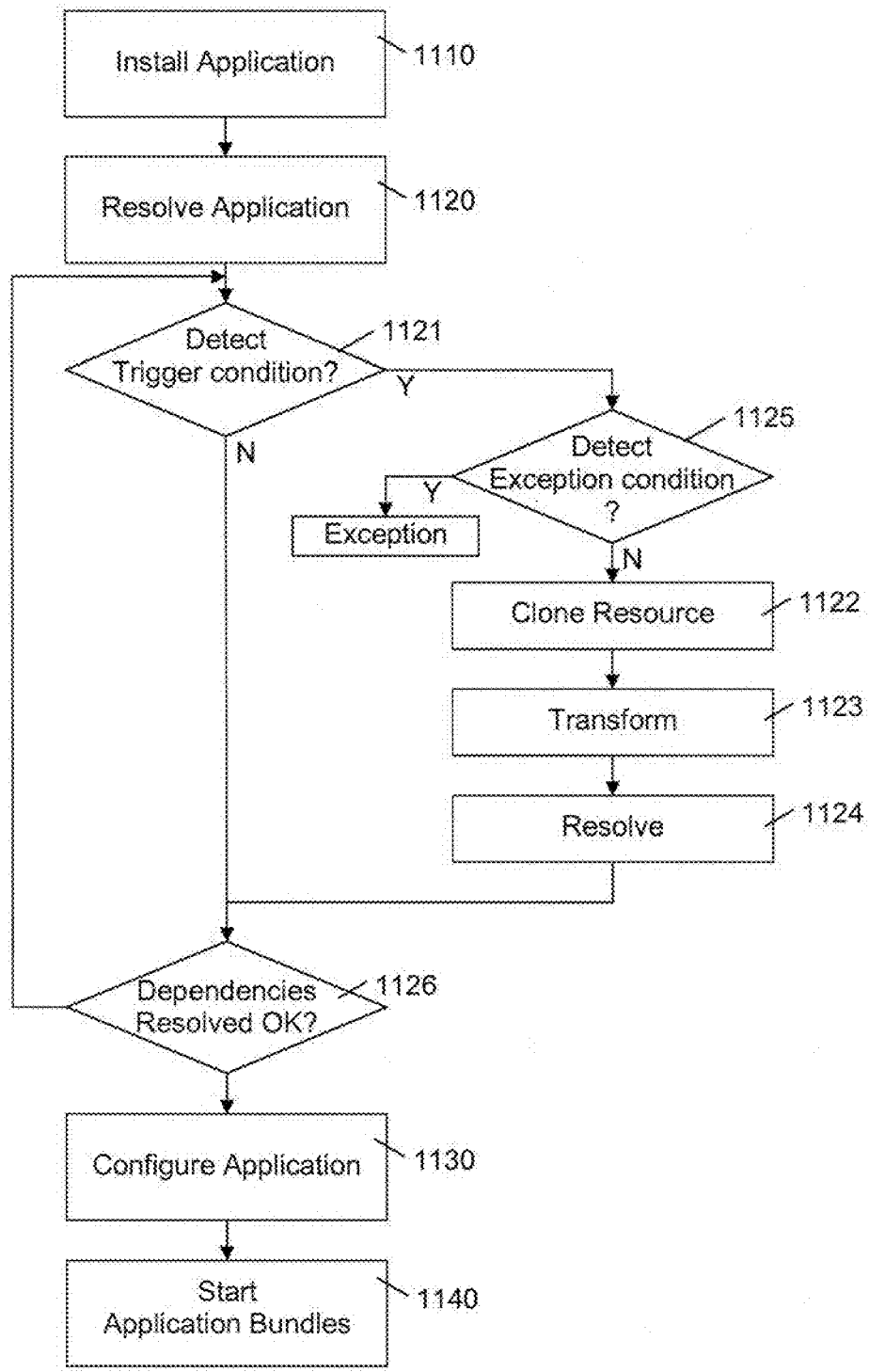
FIG. 11 is a schematic flowchart of an exemplary method of deploying an application program in a computer system, which includes an exemplary method of resolving dependencies.

FIG. 11 is a schematic flowchart of an exemplary method of deploying an application in a computer system, which includes a method of resolving dependencies.

In FIG. 11, the application is installed at step 1110. The installed application bundles are then resolved at that step 1120. The resolved application is configured at step 1130 and each of the bundles are then started at step 1140. Here, the step 1120 of resolving the application 100 is subdivided into the steps of detecting a trigger condition in step 1121, cloning a resource in step 1122, transforming the application to depend on the cloned resource in step 1123 and resolving (i.e. wiring) the transformed application according to the dependency on the cloned resource in step 1124.

The illustrated method optionally further includes the step 1125 of detecting an exception condition, which is suitably based on a predetermined list of resources which are to be excluded from the cloning, transforming and resolving of steps 1122-1124. Here, the step 1125 may include raising an exception in response to detecting the exception condition.

As also shown in FIG. 11, the detecting, cloning, transforming and resolving steps 1121-1124 (and 1125) may be performed recursively until all of the dependencies of the application have been resolved. That is, the method optionally includes the step 1126 of confirming that all of the dependencies have been resolved by valid wiring and, if not, then repeating the above steps.

Figure 12:
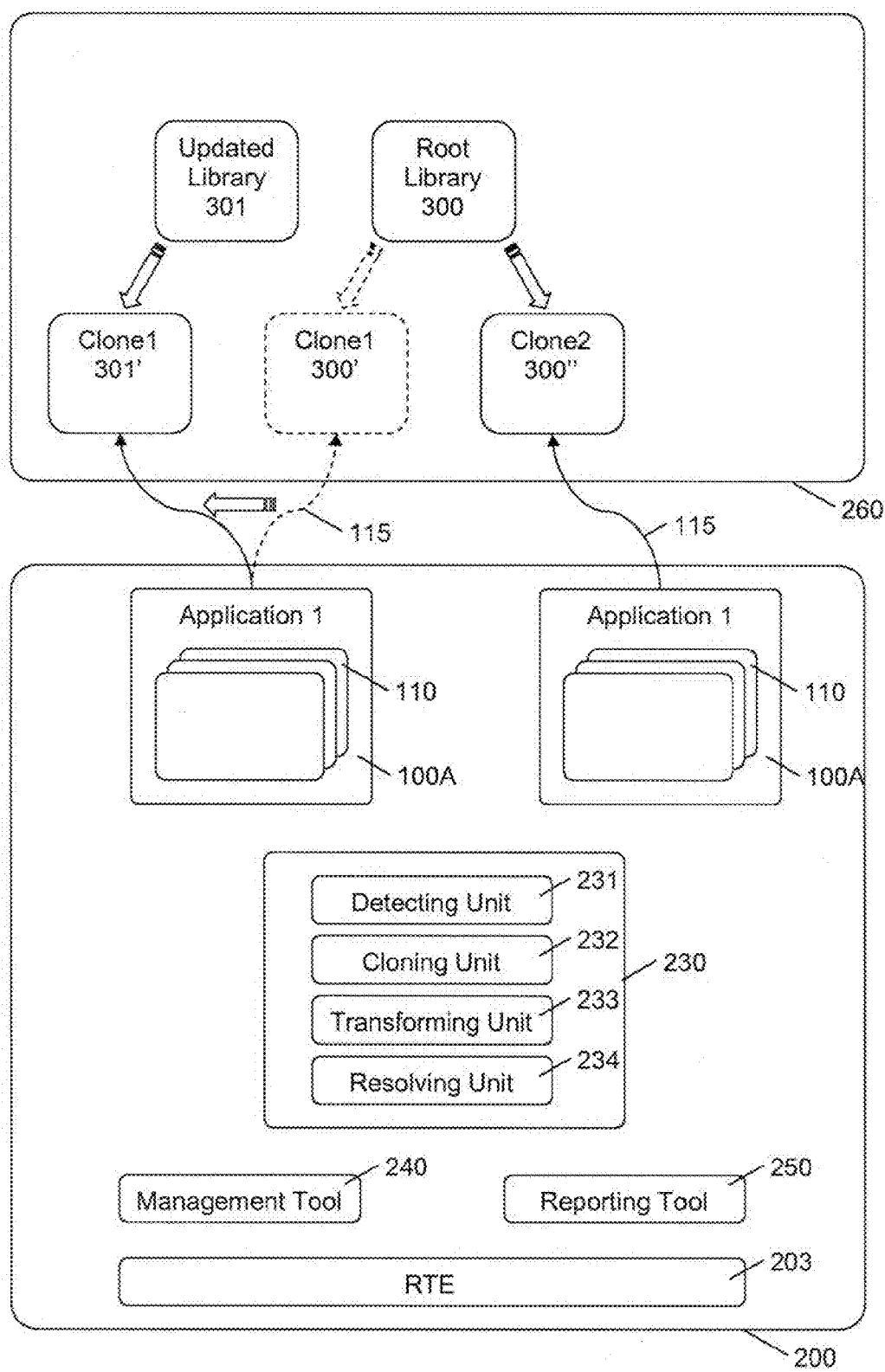
FIG. 12 is another schematic diagram showing further aspects of the computer system in more detail in more detail.

FIG. 12 is another schematic diagram of the computer system, which shows the management console 240 and the reporting unit 250 in more detail. Here, the reporting unit 250 provides a user interface that gives a report for each of the clones 300' created by the cloning unit 232 as described above, together with an indication of the trigger condition which caused the cloning. Optionally, the reporting unit 250 further reports the transformations made by the transforming unit 233. Thus, the user interface provides transparency as to the changes that have been made automatically by the computer system 200 in deploying this application 100. Also, as described above, the management console 240 provides a user interface with control over these automatic functions, such as by allowing the user to set the mandatory cloning property M and/or the singleton property S for each library. Here, the library resources 300 are treated by default as being cloneable, unless associated with the S or M property. In another embodiment, the libraries are treated as singletons by default and then cloned only if associated with a cloneable property C or the mandatory property M, which may be user-assigned or system-assigned.

As also shown in FIG. 12, the computer system 200 is further arranged to update the resources 300 available to applications 100 that have already been deployed into the runtime execution environment 203. In particular, the deployment unit 230 is arranged to update a library resource 300 with an updated version 301. Here, the reporting unit 250 suitably reports a list of clones 300' that have been cloned from a particular root library 300, such as a list of the clones 300' derived from the FreeMarker library mentioned above. FIG. 12 shows an example root library 300 and two clones, namely Clone 1 300' and Clone2 300". The management unit 240 provides a user interface that receives user commands to select one or more of the clones 300', 300" to be updated with the new version of the root library 301. The cloning unit 232 clones the new root library 301 to produce a corresponding set of updated clones 301'. The applications 100 are updated and refreshed to depend instead on the new clones 301. In the example embodiment, the first application 100A is transformed by the transforming unit 233 and resolved by the resolving unit 234 to depend now on the updated "Clone1" 301'. Meanwhile, the second application 100B is left unchanged. Thus, the exemplary computer system 200 has a flexible and powerful mechanism update the resources 300.

In summary, the exemplary embodiments have described an improved mechanism to deploy applications and resolve dependencies within a computer system The industrial application of the exemplary embodiments will be clear from the discussion herein.

Although a few exemplary embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer system, comprising:
one or more processors; and
memory, wherein the one or more processors is configured to
support a runtime environment arranged to execute a plurality of application programs with respect to a plurality of resources, wherein each of the plurality of application programs has a set of dependencies upon one or more of the plurality of resources, and
deploy the plurality of application programs into the runtime environment according to the set of dependencies by detecting a trigger condition in relation to a first resource of the plurality of resources when deploying one of the plurality of application programs with respect to the first resource, wherein the first resource upon which the one of the plurality of application programs depends is pinned to a second resource of the plurality of resources or another of the plurality of application programs by wiring;
cloning the first resource to create a first cloned resource, in response to the trigger condition being detected;
transforming the dependencies of the one of the plurality of application programs to replace a first set of dependencies on the first resource and instead with a second set of dependencies on the first cloned resource, and
creating a set of wirings between the one of the plurality of application programs and the plurality of resources upon which the one of the plurality of application programs depends, including creating wirings with the first cloned resource according to the transformed dependencies of the one of the plurality of application programs.

2. The computer system of claim 1, wherein the one or more processors is configured to determine that one or more dependencies associated with the one of the plurality of application programs cannot be resolved successfully and recursively resolve the one or more dependencies before starting the one of the plurality of application programs in the runtime environment.

3. The computer system of claim 2, wherein the one or more processors is configured to detect the trigger condition where the cloning of the first resource has caused another of the plurality of resources to become pinned.

4. The computer system of claim 1, wherein the one or more processors is configured to identify one or more of the plurality of resources as being excluded resources which should not be cloned and detect an exception condition when the first resource is one of the excluded resources.

5. The computer system of claim 4, wherein the one or more processors is configured to detect the exception condition when the first resource has a singleton property indicating that the first resource should not be cloned.

6. The computer system of claim 4, wherein the one or more processors is configured to report the exception condition.

7. The computer system of claim 4, wherein the one or more processors is configured to mark the first resource as one of the excluded resources in response to a received user command.

8. The computer system of claim 1, wherein the one or more processors is configured to detect the trigger condition when the first resource is associated with a mandatory cloning property indicating that cloning of the resource is mandatory.

9. The computer system of claim 8, wherein the one or more processors is configured to associate the first resource with the mandatory cloning property in response to a received user command.

10. The computer system of claim 1, wherein the plurality of resources comprise a plurality of libraries.

11. The computer system of claim 1, wherein the one or more processors is configured to resolve the dependencies of the one of the plurality of application programs by creating a network of wirings between bundles in the plurality of application programs and bundles in the plurality of resources.

12. A method of resolving dependencies in a computer system, the method comprising:
  detecting a trigger condition in relation to a first resource provided on the computer system, wherein the first resource upon which a first application program depends is pinned to a second resource or a second application program by wiring;
  creating a clone of the first resource in response to detecting the trigger condition;
  transforming a dependency of the first application program on the first resource to instead depend on the clone of the first resource; and
  resolving the dependency of the first application program using the clone.

13. The method of claim 12, further comprising:
  installing the first application program onto the computer system;
  resolving one or more bundles of the first application program to satisfy a set of dependencies of the bundles with respect to a plurality of resources of the computer system, wherein the plurality of resources include the first resource;
  configuring the first application program with respect to the plurality of resources according to configuration in each of the bundles;
  starting the bundles in a runtime execution environment of the computer system; and
  executing the first application program in the runtime execution environment of the computer system in combination with the plurality of resources.

14. A non-transitory computer readable medium having programming instructions for resolving dependencies in a computer system, the computer readable medium comprising:
  programming instructions for detecting a trigger condition in relation to a first resource provided on the computer system, wherein the first resource upon which a first application program depends is pinned to a second resource or a second application program by wiring;
  programming instructions for creating a clone of the first resource in response to detecting the trigger condition;
  programming instructions for transforming a dependency of the first application program on the first resource to instead depend on the clone of the first resource; and
  programming instructions for resolving the dependency of the first application program using the clone.

15. The computer readable medium of claim 14, further comprising:
  programming instructions for installing the first application program onto the computer system;
  programming instructions for resolving one or more bundles of the first application program to satisfy a set of dependencies of the bundles with respect to a plurality of resources of the computer system, wherein the plurality of resources include the first resource;
  programming instructions for configuring the first application program with respect to the plurality of resources according to configuration in each of the bundles;
  programming instructions for starting the bundles in a runtime execution environment of the computer system; and
  programming instructions for executing the first application program in the runtime execution environment of the computer system in combination with the plurality of resources.

16. The method of claim 12, further comprising:
  determining that one or more dependencies associated with the first application program cannot be resolved; and
  recursively resolving the one or more dependencies before starting the first application program.

17. The method of claim 16, wherein the detecting a trigger condition comprises detecting another of the plurality of resources has become pinned due to the creating of the clone of the first resource.

18. The method of claim 12, further comprising:
  identifying one or more of the plurality of resources as being excluded resources which should not be cloned; and
  detecting an exception condition when the first resource is one of the excluded resources.

19. The method of claim 12, wherein the first resource is associated with a mandatory cloning property.

* * * * *